US011883942B2

(12) United States Patent
Bothmann et al.

(10) Patent No.: US 11,883,942 B2
(45) Date of Patent: Jan. 30, 2024

(54) FLOW PATH DIVERTER FOR PNEUMATIC TOOL

(71) Applicant: Snap-on Incorporated, Kenosha, WI (US)

(72) Inventors: Richard Bothmann, Round Lake, IL (US); Brian King, Oak Creek, WI (US); Raymond E. Kinsley, Mount Pleasant, WI (US)

(73) Assignee: Snap-on Incorporated, Kenosha, WI (US)

( * ) Notice: Subject to any disclaimer, the term of this patent is extended or adjusted under 35 U.S.C. 154(b) by 39 days.

(21) Appl. No.: 16/910,274

(22) Filed: Jun. 24, 2020

(65) Prior Publication Data

US 2021/0402587 A1 Dec. 30, 2021

(51) Int. Cl.

| | |
|---|---|
| ***B25F 5/02*** | (2006.01) |
| ***B25F 5/00*** | (2006.01) |
| ***F01C 1/344*** | (2006.01) |
| ***F01C 21/18*** | (2006.01) |
| ***F01C 13/02*** | (2006.01) |
| *B25B 21/02* | (2006.01) |

(52) U.S. Cl.

CPC ................ *B25F 5/02* (2013.01); *B25F 5/005* (2013.01); *F01C 1/3442* (2013.01); *F01C 13/02* (2013.01); *F01C 21/18* (2013.01); *B25B 21/02* (2013.01)

(58) Field of Classification Search

CPC .......... B25F 5/02; B25F 5/005; F01C 1/3442; F01C 13/02; F01C 21/18; B25B 21/02

See application file for complete search history.

(56) References Cited

U.S. PATENT DOCUMENTS

| | | | |
|---|---|---|---|
| 2,257,892 | A | 10/1941 | Engeln et al. |
| 2,257,893 | A | 10/1941 | Engein et al. |
| 3,018,866 | A | 1/1962 | Eckman et al. |

(Continued)

FOREIGN PATENT DOCUMENTS

| | | | |
|---|---|---|---|
| CN | 102400715 | A | 4/2012 |
| CN | 103195480 | A | 7/2013 |

(Continued)

OTHER PUBLICATIONS

Examination Report No. 1 for corresponding Application No. 2021204284 dated Mar. 23, 2022, 3 pages.

(Continued)

*Primary Examiner* — Thomas M Wittenschlaeger
*Assistant Examiner* — Katie L Gerth
(74) *Attorney, Agent, or Firm* — Seyfarth Shaw LLP

(57) ABSTRACT

The present invention relates broadly to a flow diverter disposed in a plenum area of a motor cylinder chamber (also referred to as kidney ports). The flow diverter acts as a barrier between a main inlet to the motor and an inlet to the cylinder chamber, and directs air or fluid to vane lifter ports of the motor before the air or fluid flows to the inlet to the cylinder chamber. In addition, the flow diverter can serve to regulate air or fluid flowing into the cylinder chamber to control power of the tool. The flow diverter allows for numerous options of where the main inlet to the motor can be positioned and provides a means of regulating the air or fluid flowing into the cylinder chamber.

16 Claims, 8 Drawing Sheets

(56) References Cited

U.S. PATENT DOCUMENTS 3,238,848 A * 3/1966 Bent ........................ F01C 1/344 418/268
3,253,662 A 5/1966 Sacchini
3,334,487 A 8/1967 Pauley
3,556,230 A 1/1971 Roggenburk
3,951,217 A * 4/1976 Wallace .................. B25B 21/02 173/218
4,557,674 A 12/1985 Arnett, Jr.
4,960,373 A 10/1990 Albert et al.
5,626,198 A * 5/1997 Peterson ................. B25B 21/02 173/93.5
6,044,917 A 4/2000 Brunhoelzl
6,059,049 A 5/2000 Lin et al.
6,082,986 A * 7/2000 Seward ................... F01C 13/02 418/268
6,250,399 B1 6/2001 Giardino
6,883,617 B2 4/2005 Lionberg et al.
6,883,619 B1 * 4/2005 Huang .................... B25B 21/02 173/168
6,935,437 B2 8/2005 Izumisawa et al.
7,040,414 B1 5/2006 Kuo
7,198,116 B1 4/2007 Chen
7,222,680 B2 * 5/2007 Livingston .............. F01C 20/04 173/218
7,354,260 B1 * 4/2008 Chang ..................... F01C 13/02 418/268
7,455,122 B2 11/2008 Chen
7,458,429 B2 * 12/2008 Chen ....................... B25B 21/02 173/104
7,461,704 B2 * 12/2008 Chen ......................... B25F 5/00 173/221
7,572,119 B2 * 8/2009 Lin .......................... B23Q 5/06 418/270
7,594,550 B2 * 9/2009 Chen ....................... B25B 21/02 173/104
8,141,654 B2 * 3/2012 Lin ......................... B25B 21/02 173/104
8,375,832 B2 * 2/2013 Chen ....................... B25F 5/001 81/463
8,844,646 B2 * 9/2014 Lu .......................... B23D 51/18 173/114
9,322,417 B2 4/2016 Lai et al.
9,333,611 B2 * 5/2016 Dotan ...................... B23Q 5/06
9,421,238 B2 8/2016 Brown et al.
9,849,575 B2 * 12/2017 Costoli ..................... B25F 5/00
9,913,801 B2 3/2018 Brown et al.
10,513,025 B2 * 12/2019 Patel ........................ B25D 9/08
10,677,060 B2 * 6/2020 Wu ......................... F01C 21/10
2003/0230423 A1 * 12/2003 Izumisawa ............ B25B 23/145 173/107
2006/0113099 A1 6/2006 Livingston et al.
2007/0137873 A1 * 6/2007 Livingston .............. F01C 20/18 173/104
2008/0073097 A1 3/2008 Chen
2012/0080208 A1 4/2012 Chiang et al.
2012/0137875 A1 * 6/2012 Lin ........................ F01C 21/186 92/169.1
2012/0138329 A1 6/2012 Cheng et al.
2012/0261154 A1 * 10/2012 Chen .......................... B25F 5/00 173/221
2012/0292071 A1 11/2012 Hua et al.
2012/0318544 A1 * 12/2012 Sun ........................... B25F 5/00 173/221
2013/0039795 A1 2/2013 Wen
2014/0020923 A1 * 1/2014 Su ........................... B25B 21/02 173/218
2014/0231111 A1 8/2014 Brown et al.
2014/0234397 A1 8/2014 Brown et al.
2014/0290973 A1 * 10/2014 Lin ........................... B25F 5/02 173/104
2014/0360744 A1 * 12/2014 Lawrence ........... B25B 23/1453 173/218
2015/0197003 A1 7/2015 Huang et al.
2015/0366933 A1 12/2015 Brown et al.
2017/0000841 A1 1/2017 Brown et al.
2018/0209272 A1 * 7/2018 Wu ..................... F01C 21/0809
2021/0394351 A1 * 12/2021 Bothmann .............. B25F 5/001

FOREIGN PATENT DOCUMENTS

| | | | |
|---|---|---|---|
| CN | 103244190 | A | 8/2013 |
| CN | 108343473 | A | 7/2018 |
| DE | 102013100723 | | 7/2014 |
| EP | 0576186 | A1 | 12/1993 |
| GB | 1048159 | | 11/1966 |
| GB | 1413427 | A | 11/1975 |
| GB | 2075121 | A | 11/1981 |
| TW | M541520 | A | 5/2017 |

OTHER PUBLICATIONS

Combined Search and Examination Report for corresponding Application No. GB2108709.3 dated Apr. 20, 2022, 8 pages.

Examination Report No. 4 for corresponding Australian Application No. 2021204284 dated Apr. 4, 2023, 3 pages.

Taiwan Office Action for corresponding Application No. 11121176650 dated Nov. 30, 2022, 14 pages.

Examination Report for corresponding Application No. GB2108709.3 dated Feb. 20, 2023, 5 pages.

Examination Report for corresponding Application No. 2021204284 dated Feb. 22, 2023, 3 pages.

Canadian Office Action for corresponding CA Application No. 3,122,660, dated Apr. 19, 2023, 4 pages.

Chinese Office Action for corresponding CN Application No. 202110691737.2, dated Jun. 28, 2023, 15 pages.

* cited by examiner

FLOW PATH DIVERTER FOR PNEUMATIC TOOL

TECHNICAL FIELD OF THE INVENTION

The present invention relates to a mechanism that directs flow of air or fluid in a pneumatic tool.

BACKGROUND OF THE INVENTION

Many tools are powered by pneumatic air or hydraulic fluid. Impact wrenches, for example, can impart torque to a work piece to loosen or tighten the work piece. In traditional tools, an air inlet to the motor is positioned close to vane lifter ports of the motor. This positioning of the air inlet is required to cause air to flow into the vane lifter ports and behind vanes of the motor to deploy the vanes before a significant amount of air enters a cylinder chamber of the motor. However, the positioning of the air inlet close to the vane lifter ports limits the type of motor that can be used in pneumatic tools.

SUMMARY OF THE INVENTION

The present invention relates broadly to a flow diverter disposed in a plenum area of a motor cylinder chamber (also referred to as kidney ports, due to their shape). The flow diverter acts as a barrier between a main inlet to the motor and an inlet to the cylinder chamber, and directs air or fluid to vane lifter ports of the motor before the air or fluid flows to the inlet to the cylinder chamber. In addition, the flow diverter can serve to regulate air or fluid flowing into the cylinder chamber to control power of the tool. The flow diverter allows for numerous options of where the main inlet to the motor can be positioned and provides a means of regulating the air or fluid flowing into the cylinder chamber.

In an embodiment, the present invention relates to a tool having a motor powered by air or fluid. The tool includes a rotor having radially extending vanes, and a cylinder chamber adapted to receive the rotor. The cylinder chamber includes a first main inlet port adapted to receive air or fluid, a first port in fluid communication with the first main inlet port and a vane lifter port of the motor, and a first cylinder inlet in fluid communication with the first main port. The tool also includes a first flow diverter disposed in the first port and adapted to act as a barrier to direct a flow of air or fluid into the vane lifter port before the first cylinder inlet.

In another embodiment, the present invention relates to a motor powered by air or fluid. The motor includes a cylinder chamber and a first flow diverter. The cylinder chamber includes a first main inlet port adapted to receive air or fluid, a first port in fluid communication with the first main inlet port and a vane lifter port of the motor, and a first cylinder inlet in fluid communication with the first main port. The first flow diverter is disposed in the first port and adapted to act as a barrier to direct a flow of air or fluid into the vane lifter port before the first cylinder inlet.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

Figure 1:
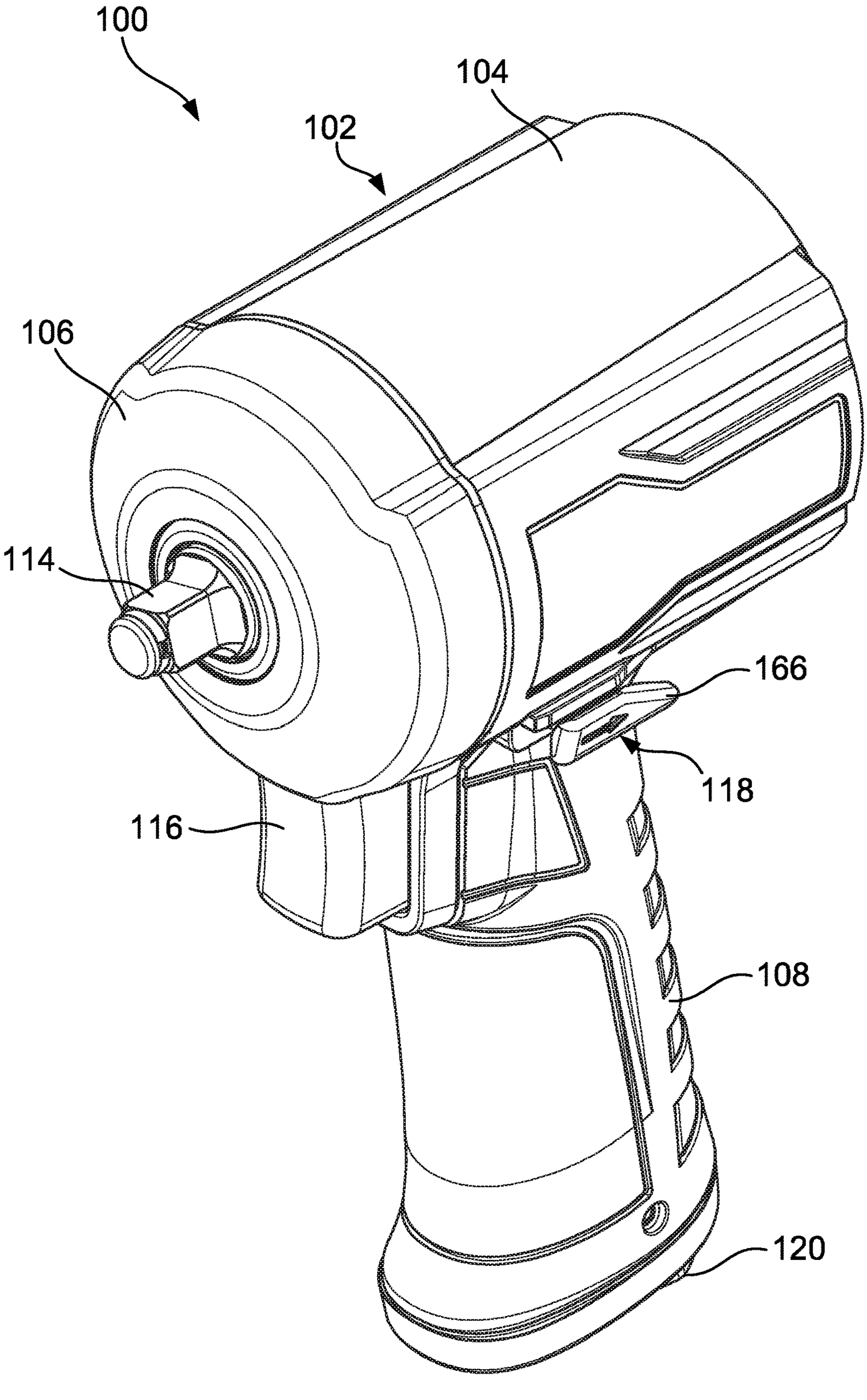
FIG. 1 is a perspective view of a tool according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term “present invention” is not intended to limit the scope of the claimed invention and is instead a term used to discuss exemplary embodiments of the invention for explanatory purposes only.

The present invention relates broadly to a flow diverter disposed in a plenum area of a motor cylinder chamber (also referred to as kidney ports due to their shape). The flow diverter acts as a barrier between a main inlet to the motor and an inlet to the cylinder chamber, and directs air or fluid to vane lifter ports of the motor before the air or fluid flows to the inlet to the cylinder chamber. In addition, the flow diverter can regulate air or fluid flowing into the cylinder chamber to control power of the tool. The flow diverter allows for numerous options of where the main inlet to the motor can be positioned and provides a means of regulating the air or fluid flowing into the cylinder chamber.

Figure 2:
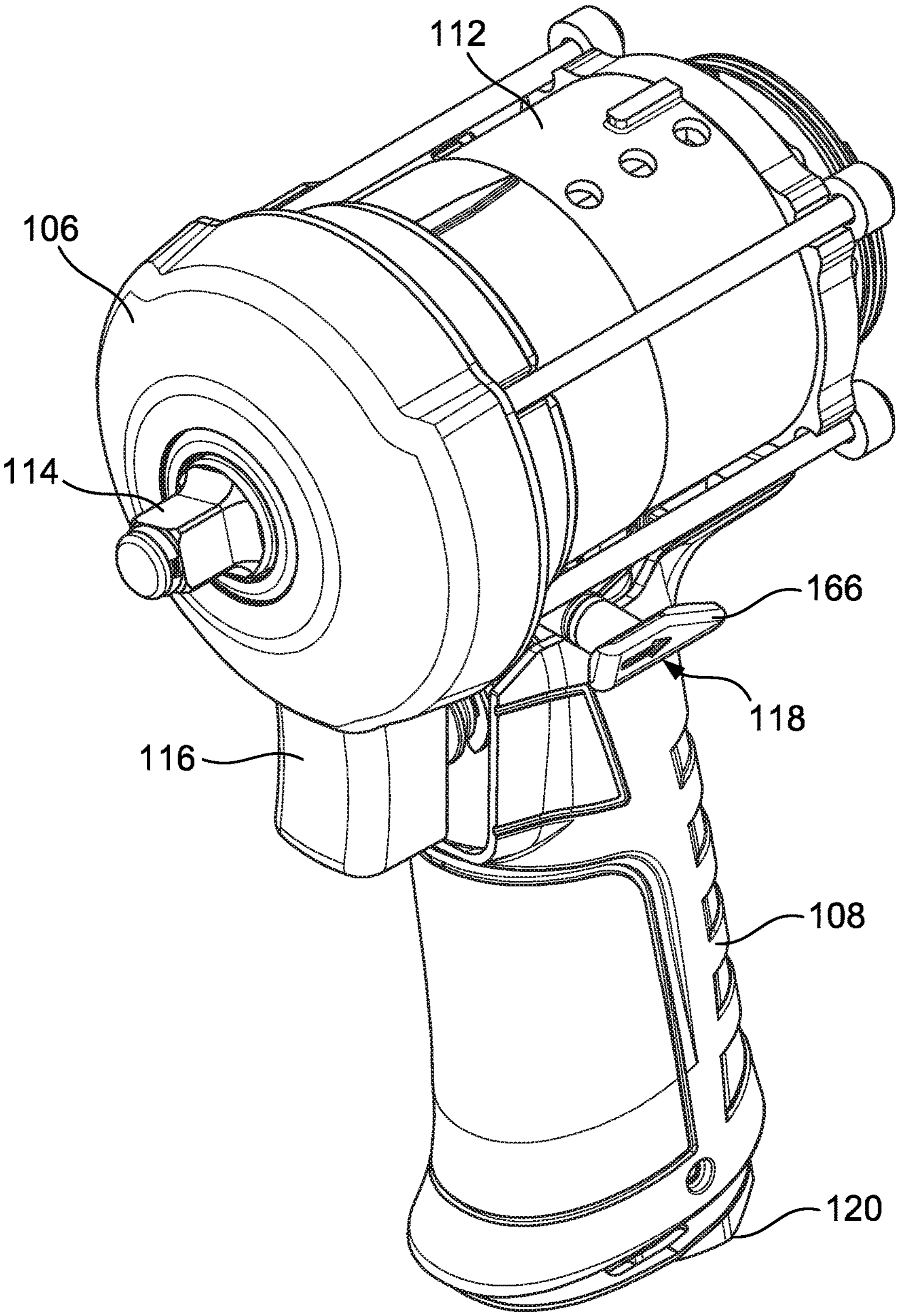
FIG. 2 is a perspective view of the tool of FIG. 1 with a motor housing removed, according to an embodiment of the present invention.

Referring to FIGS. 1 and 2, a tool 100, such as a pneumatic impact wrench, is illustrated. The tool 100 includes a housing 102 having a motor housing portion 104, a nose housing portion 106, and a handle housing portion 108. The nose housing 106 is adapted to couple to an end of the motor housing portion 104, and the handle housing portion 108 extends from the motor housing portion 104. The motor housing portion 104 and handle housing portion 108 may be disposed at an angle with respect to each other. For example, a longitudinal axis of the motor housing portion 104 and a longitudinal axis of the handle housing portion 108 may be disposed at an angle of about 100 to about 120 degrees, and more particularly about 110 degrees with respect to each other.

The tool 100 may also include a motor 112 disposed in the housing 102, an output mechanism 114 at a working end of the tool 100 and operably coupled to an output shaft 122 of the motor 112, an actuatable trigger 116, and a direction selector mechanism 118. The trigger 116 is disposed in and extends from the handle housing portion 108 proximal to the motor housing portion 104. The trigger 116 can be actuated by a user to cause fluid, such as, for example, pressurized air or hydraulic fluid, from an external supply to operate the tool 100 to drive the output mechanism 114 (such as an output lug) selectively in either one of first and second rotational directions (e.g., clockwise and counterclockwise). The output mechanism 114 can be coupled to other devices, such as a socket, to apply torque to a work piece, such as, for example, a screw or bolt, in a well-known manner. The trigger 116 can be biased such that the user can depress the trigger 116 inwardly, relative to the tool 100, to cause the tool 100 to operate, and release the trigger 116, wherein the biased nature of the trigger 116 causes the trigger 116 to move outwardly, relative to the tool 100, to cease operation of the tool 100. The rotational direction of a rotor or the motor, and, consequently, the output mechanism 114, are controlled by the direction selector mechanism 118, which is adapted to cause direction of externally supplied fluid (at the air inlet 120) in either one of first and second directions.

Figure 3:
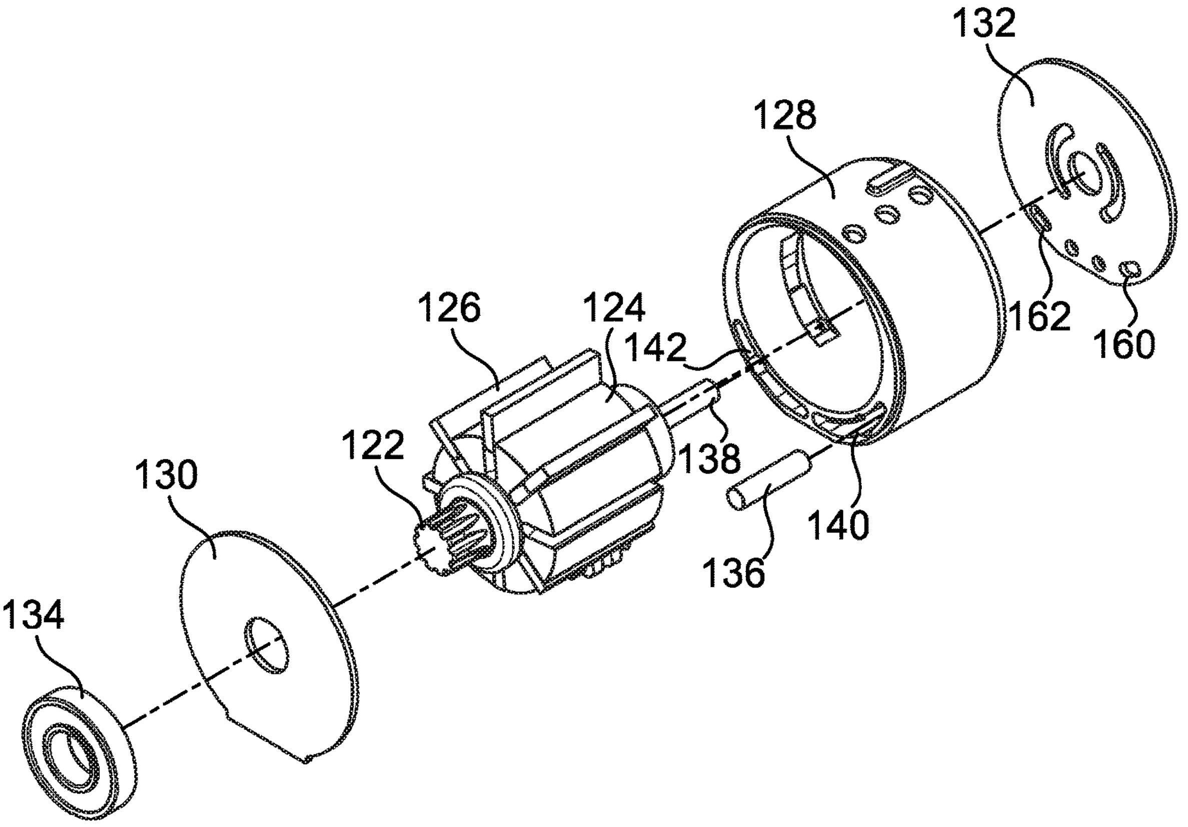
FIG. 3 is an exploded view of a motor according to an embodiment of the present invention.
Figure 4:
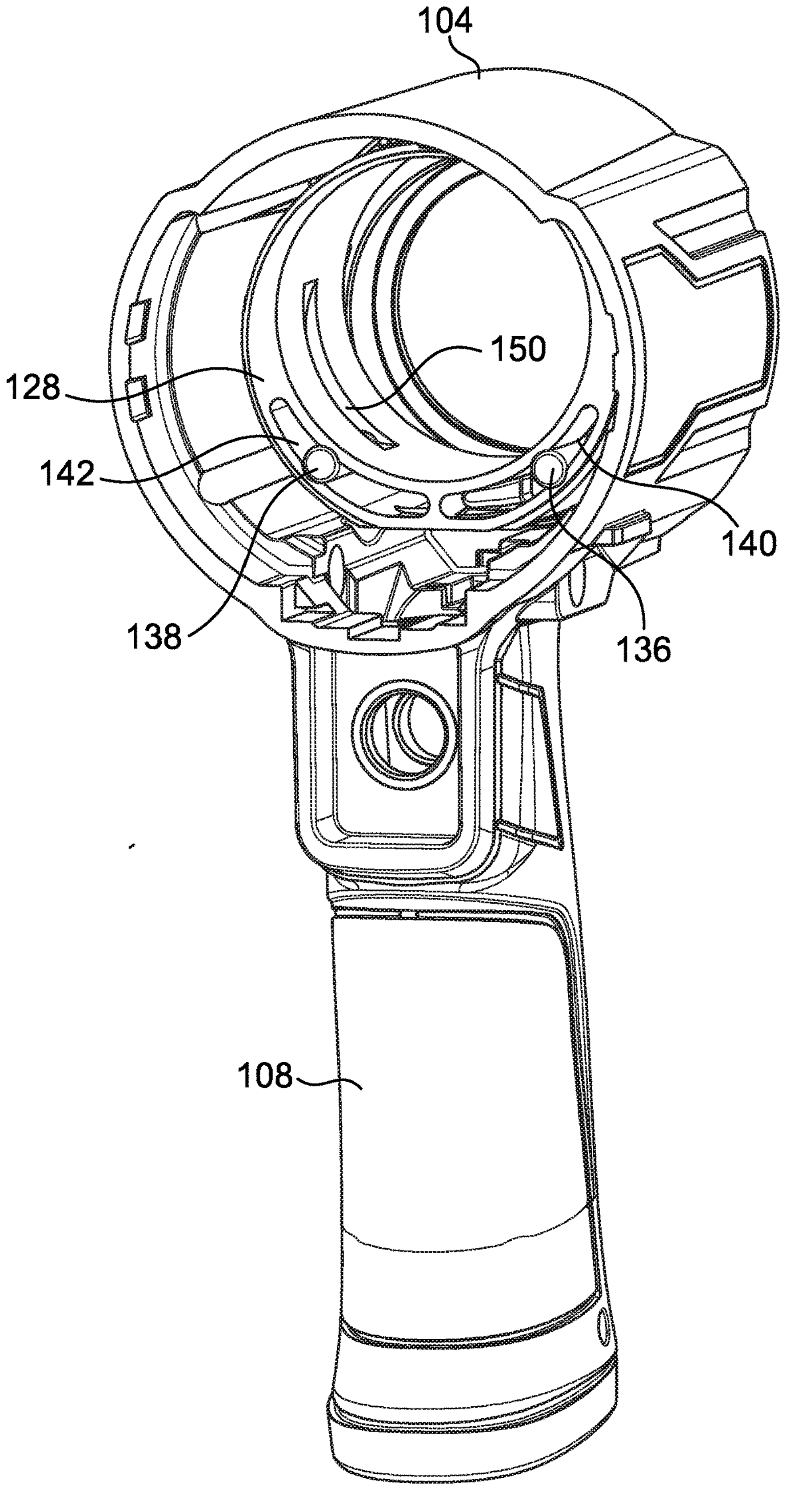
FIG. 4 is a perspective view of a cylinder of a motor and flow diverters installed in a tool according to an embodiment of the present invention.
Figure 5:
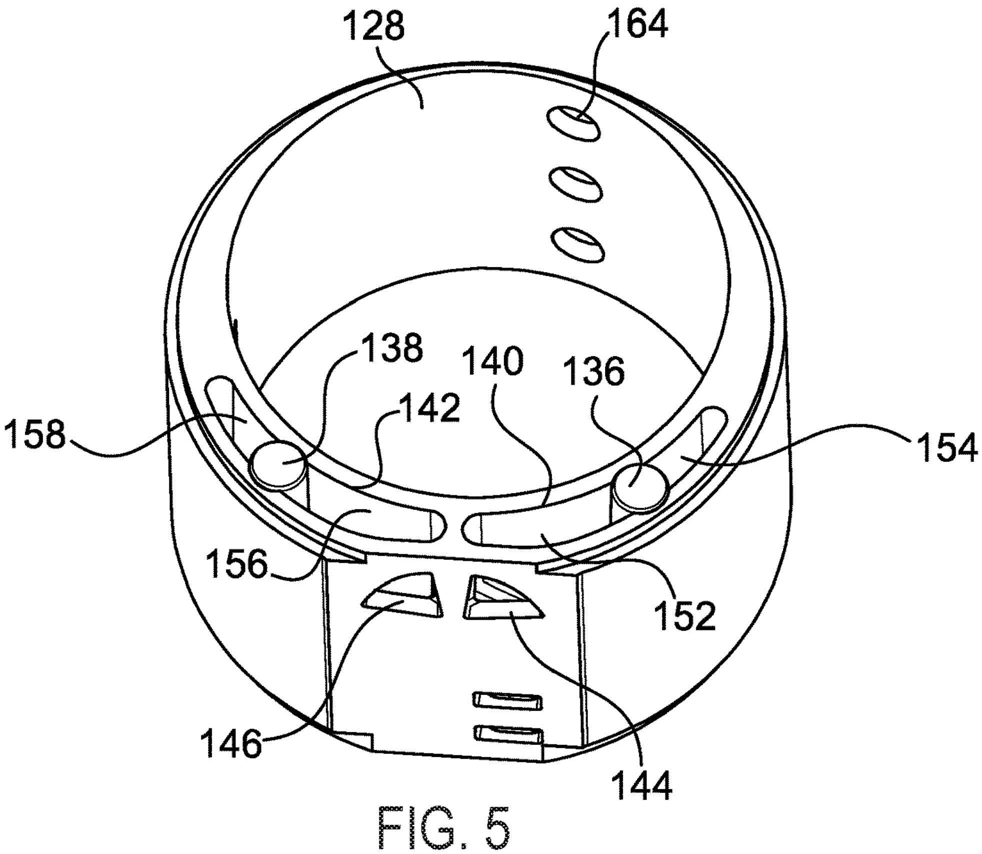
FIG. 5 is a first perspective view of a cylinder of a motor and flow diverters according to an embodiment of the present invention.
Figure 6:
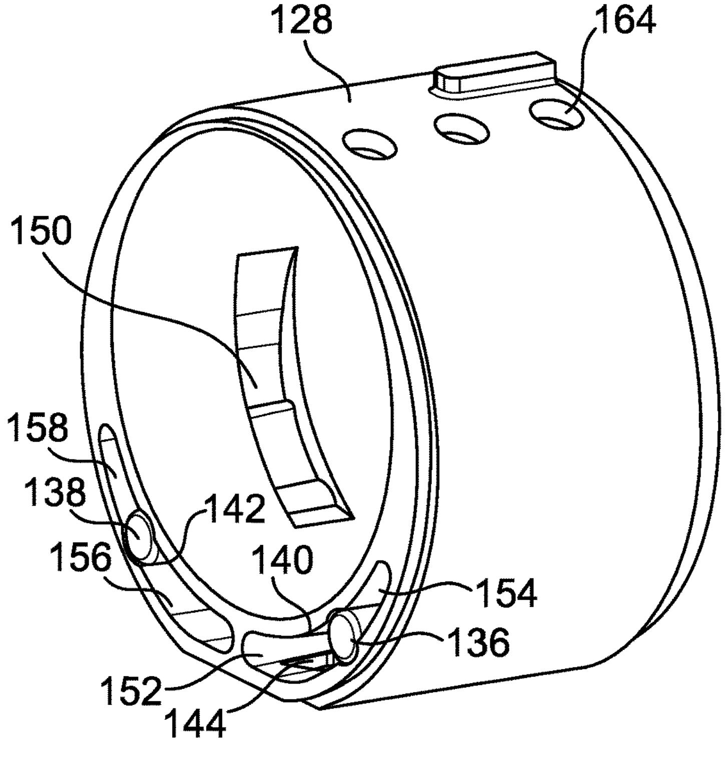
FIG. 6 is a second perspective view of a cylinder of a motor and flow diverters according to an embodiment of the present invention.
Figure 7:
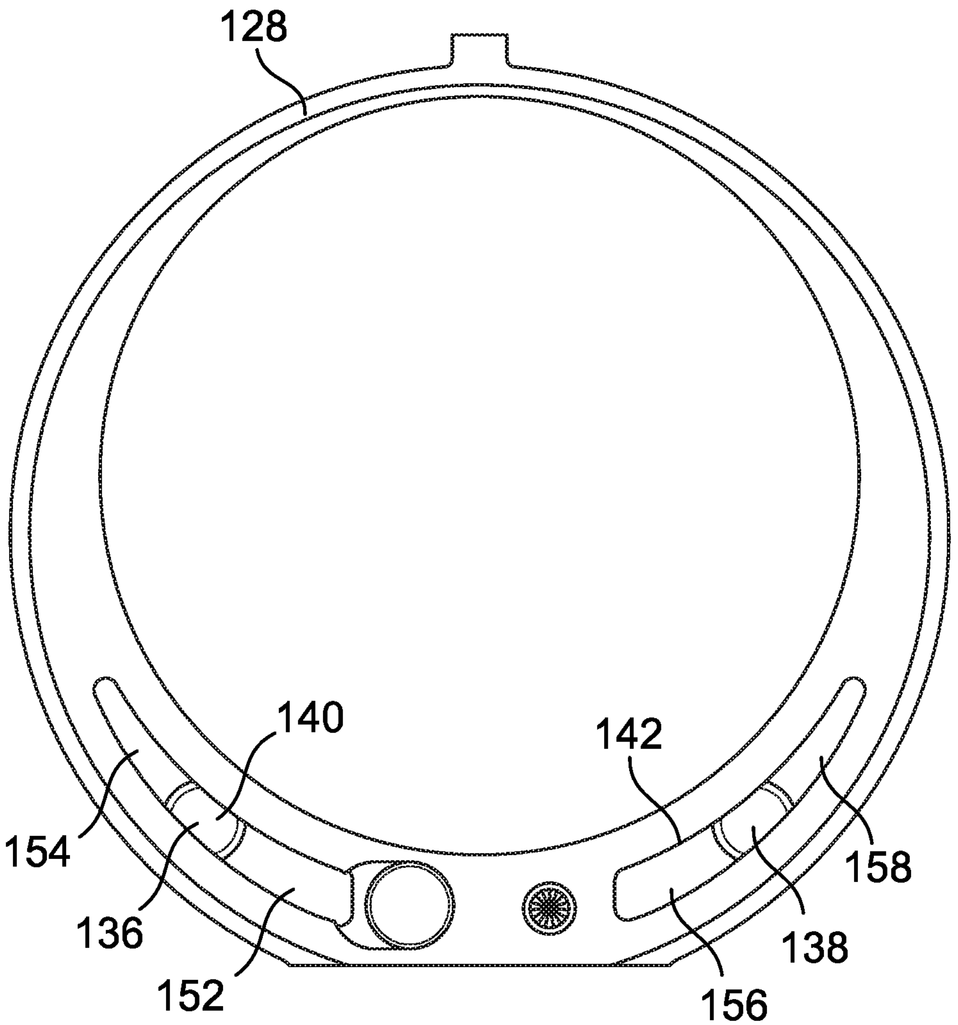
FIG. 7 is an end view of a cylinder of a motor and flow diverters according to an embodiment of the present invention.

Referring to FIG. 3, the motor 112 includes the motor shaft 122 coupled to a rotor 124, which includes vanes 126 extending radially outwardly from the rotor 124. The motor 112 also includes a cylinder chamber 128, and first and second motor end portions or caps 130 and 132 and a bearing 134 disposed around the motor shaft 122.

First and second flow diverters 136 and 138 are respectively disposed in and extend longitudinally in first and second ports 140 and 142 (also referred to as kidney ports) of the cylinder chamber 128. For example, the first flow diverter 136 is disposed in and extends longitudinally in the first port 140, and the second flow diverter 138 is disposed in and extends longitudinally in the second port 142. Each of the first and second flow diverters 136 and 138 acts as a barrier between a main inlet to the motor and an inlet to the cylinder chamber 128, and directs air or fluid to vane lifter ports of the motor before the air or fluid flows to the inlet to the cylinder chamber 138. Each of the first and second flow diverters 136 and 138 can serve to regulate the amount or pressure of air or fluid flowing into the cylinder chamber 128 to control power of the tool 100. The first and second flow diverters 136 and 138 allow for numerous options of where the main inlet to the motor 112 can be positioned and provides a means of regulating the air or fluid flowing into the cylinder chamber 128.

For example, referring to FIGS. 3-9, the cylinder chamber 128 includes first and second motor inlets 144 and 146 disposed in a bottom of the cylinder that are in fluid communication with respective first and second ports 140 and 142. When the first rotational direction is selected (for example via direction selector mechanism 118), air or fluid is allowed to flow into the air inlet 120, into the first motor inlet 144, and into the first port 140. Similarly, when the second rotational direction is selected (for example via direction selector mechanism 118), air or fluid is allowed to flow into the air inlet 120, into the second motor inlet 146, and into the second port 142.

The cylinder chamber 128 also includes first and second chamber inlets 148 and 150 that are in fluid communication with respective first and second ports 140 and 142. The first flow diverter 136 is disposed in the first port 140 and acts as a barrier that separates the first port 140 into two port portions 152 and 154 proximal to a front of the motor 112. Portion 152 is in fluid communication with the first motor inlet 144, and portion 154 is in fluid communication with the first chamber inlet 148. The second flow diverter 138 is disposed in the second port 142, and acts as a barrier that separates the second port 142 into two port portions 156 and 158 proximal to a front of the motor 112. Portion 156 is in fluid communication with the second motor inlet 146, and portion 158 is in fluid communication with the second chamber inlet 150.

During operation, when the first rotational direction is selected (for example via direction selector mechanism 118), air or fluid is allowed to flow into the air inlet 120, into the first motor inlet 144, and into the first portion 152 of the first port 140. The first flow diverter 136 directs the air or fluid to a first vane lifter port(s) 160 in the end cap 132, and restricts the flow of air or fluid to the first chamber inlet 148. This allows the air or fluid flowing into the first vane lifter port(s) 160 to pressurize the first vane lifter port(s) 160 and cause vanes 126 to extend into the cylinder chamber 128. After the first vane lifter port(s) 160 are pressurized, the air or fluid is allowed to flow into the second portion 154 of the first port 140, and into the first chamber inlet 148, due to the first flow diverter 136 acting as a barrier and pressurization of the first vane lifter port(s) 160. The air or fluid flowing into the into the first chamber inlet 148 then acts on the extended vanes 126 of the rotor 124 to drive the rotor 124 in the first rotational direction.

Figure 8:
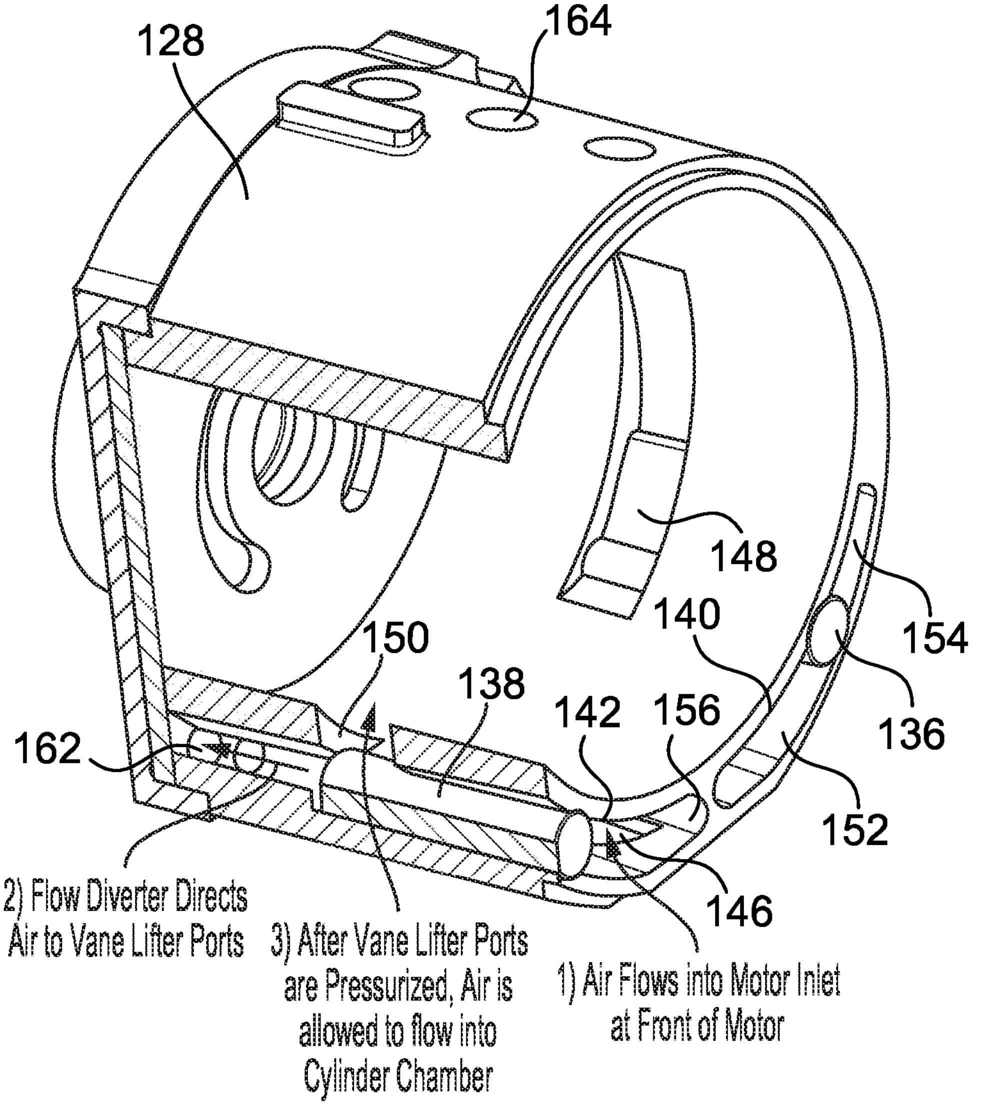
FIG. 8 is a cross-sectional view of a cylinder of a motor and flow diverters according to an embodiment of the present invention.
Figure 9:
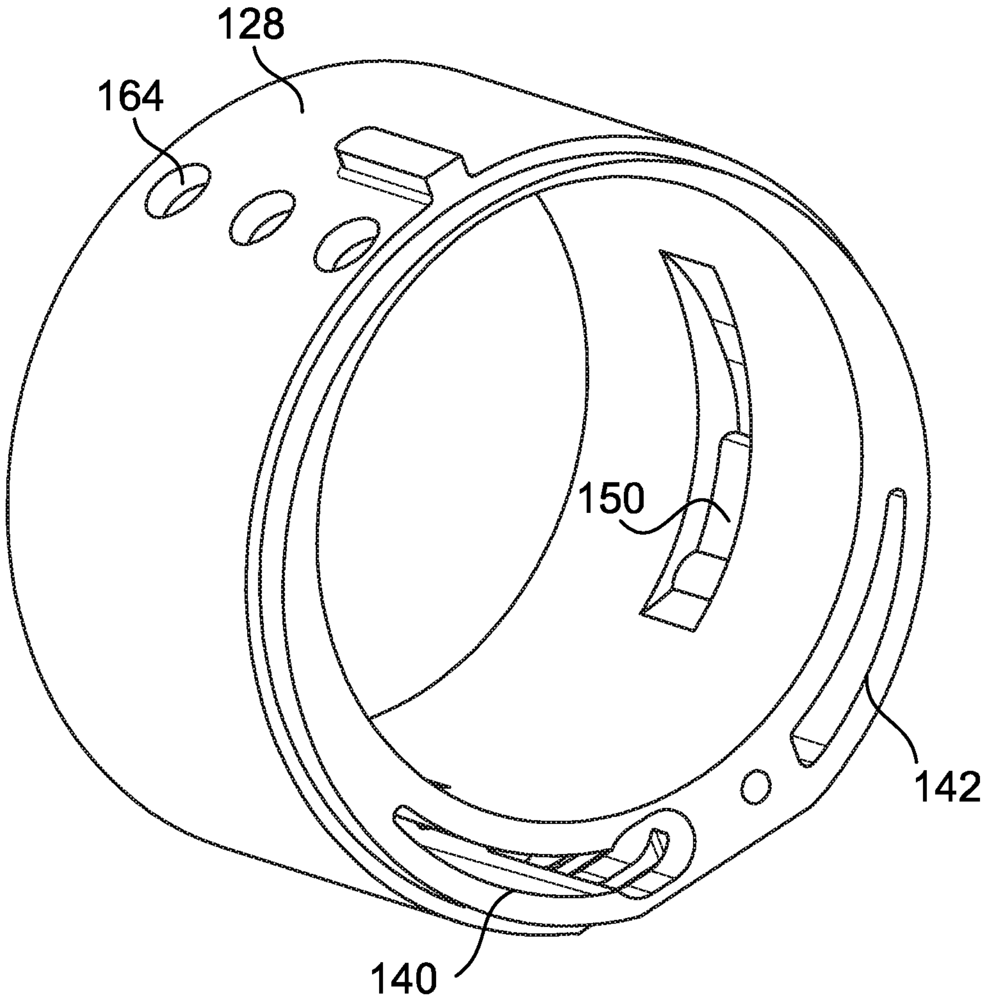
FIG. 9 is a perspective end view of a cylinder of a motor with flow diverters removed according to an embodiment of the present invention.

Similarly, referring to FIG. 8, when the second rotational direction is selected (for example via direction selector mechanism 118), air or fluid is allowed to flow into the air inlet 120, into the second motor inlet 146, and into the first portion 156 of the second port 142. The second flow diverter 138 directs the air or fluid to a second vane lifter port(s) 162 in the end cap 132, and restricts the flow of air or fluid to the second chamber inlet 150. This allows the air or fluid flowing into the second vane lifter port(s) 162 to pressurize the second vane lifter port(s) 162 and cause vanes 126 to extend into the cylinder chamber 128. After the second vane lifter port(s) 162 are pressurized, the air or fluid is allowed to flow into the second portion 158 of the second port 142, and into the second chamber inlet 150, due to the second flow diverter 138 acting as a barrier and pressurization of the second vane lifter port(s) 162. The air or fluid flowing into the into the second chamber inlet 150 then acts on the extended vanes 126 of the rotor 124 to drive the rotor 124 in the second rotational direction.

The cylinder chamber 128 also includes one or more exhaust ports 164, that allow for the exhaust or exit of air or fluid from the motor 112 after the air or fluid has driven the rotor 124.

Thus, each of the first and second flow diverters 136 and 138 acts as a barrier, and directs air or fluid to vane lifter ports of the motor before the air or fluid flows to the first or second inlet to the cylinder chamber 138. Each of the first and second flow diverters 136 and 138 can serve to regulate air or fluid flowing into the cylinder chamber 128 to control power of the tool 100.

The first and second flow diverters 136 and 138 also allow for numerous options of where the main inlet to the motor 112 can be positioned and provides a means of regulating the air or fluid flowing into the cylinder chamber 128. For example, due to the first and second flow diverters 136 and 138 acting as a barrier, the first and second motor inlets 144 and 146 can be placed in other locations, such as proximal to a front, middle, or back of the motor 112.

Referring again to FIGS. 1 and 2, the direction selector mechanism 118 includes a valve disposed in the housing 102, first and second buttons 166, and link mechanism disposed in the housing 102. A user can actuate either of the first or second buttons 166 respectively disposed on opposing first and second sides of the tool 100. For example, depressing the first button can cause the rotor 124 and thereby the output mechanism 114 to rotate in a first or clockwise rotational direction, and depressing the second button can cause the rotor 124 and thereby the output mechanism 114 to rotate in a second or counterclockwise rotational direction. In some embodiments, the first and second buttons 166 are disposed near the trigger 116 within easy reach of a user's fingers during operation of the tool 100, so the user can change the rotational direction by depressing either of the first and second buttons 166 without disengaging the tool 100 from a work piece.

Depressing the first button inwardly relative to the tool 100 causes the second button to move outwardly relative to the tool 100, and the valve to align with the first motor inlet 144. In this position, air or fluid received at the inlet 120 is directed to the first motor inlet 144. Similarly, depressing the second button inwardly relative to the tool 100 causes the first button to move outwardly relative to the tool 100, and the valve to align with the second motor inlet 146. In this position, air or fluid received at the inlet 120 is directed to the second motor inlet 146.

As discussed herein, the tool 100 can be a pneumatic tool, such as, for example, an impact wrench. However, the tool 100 can be any pneumatically or hydraulically powered or hand-held tool, such as a ratchet wrench, torque wrench, impact wrench, drill, saw, hammer, or any other tool.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool powered by air or fluid and having a rotor including radially extending vanes, the tool comprising:
- a cylinder chamber adapted to receive the rotor, and including:
  - a first main inlet port adapted to receive air or fluid;
  - a first port in fluid communication with the first main inlet port and a vane lifter port in a motor end cap; and
  - a first cylinder inlet in fluid communication with the first main inlet port; and
- a first flow diverter extending into the first port and that separates the first port into first and second portions, wherein the first flow diverter is adapted to act as a barrier to direct air or fluid into the vane lifter port before the first cylinder inlet.

2. The tool of claim 1, wherein the first portion is in fluid communication with the first main inlet port, and the second portion is in fluid communication with the first cylinder inlet.

3. The tool of claim 1, wherein the cylinder chamber further includes a second main inlet port, wherein the first main inlet port is adapted to receive air or fluid to cause the rotor to rotate in a first rotational direction, and the second main inlet port is adapted to receive air or fluid to cause the rotor to rotate in a second rotational direction.

4. The tool of claim 3, wherein the cylinder chamber further includes a second port in fluid communication with the second main inlet port and a second vane lifter port of the motor end cap.

5. The tool of claim 4, wherein the cylinder chamber further includes a second cylinder inlet in fluid communication with the second main inlet port.

6. The tool of claim 5, wherein the cylinder chamber further includes a second flow diverter disposed in the second port and adapted to act as a second barrier to direct air or fluid into the second vane lifter port before the second cylinder inlet.

7. The tool of claim 6, wherein the second flow diverter separates the second port into first and second portions, and wherein the first portion is in fluid communication with the second main inlet port.

8. The tool of claim 1, wherein the first flow diverter extends longitudinally in the first port.

9. A motor for a tool powered by air or fluid, the motor comprising:
- a cylinder chamber including:
  - a first main inlet port adapted to receive air or fluid;
  - a first port in fluid communication with the first main inlet port and a vane lifter port of a motor end cap; and
  - a first cylinder inlet in fluid communication with the first main inlet port; and
- a first flow diverter extending into the first port and that separates the first port into first and second portions, wherein the first flow diverter is adapted to act as a barrier to direct air or fluid into the vane lifter port before the first cylinder inlet.

10. The motor of claim 9, wherein the first portion is in fluid communication with the first main inlet port, and the second portion is in fluid communication with the first cylinder inlet.

11. The motor of claim 9, wherein the cylinder chamber further includes a second main inlet port.

12. The motor of claim 11, wherein the cylinder chamber further includes a second port in fluid communication with the second main inlet port and a second vane lifter port of the motor end cap.

13. The motor of claim 12, wherein the cylinder chamber further includes a second cylinder inlet in fluid communication with the second main inlet port.

14. The motor of claim 13, wherein the cylinder chamber further includes a second flow diverter disposed in the second port and adapted to act as a second barrier to direct air or fluid into the second vane lifter port before the second cylinder inlet.

15. The motor of claim 14, wherein the second flow diverter separates the second port into first and second portions, and wherein the first portion is in fluid communication with the second main inlet port.

16. The motor of claim 9, wherein the first flow diverter extends longitudinally in the first port.

* * * * *